United States Patent
Umang et al.

(10) Patent No.: US 11,065,820 B2
(45) Date of Patent: Jul. 20, 2021

(54) OPTIMIZATION APPROACH TO LOAD BALANCING AND MINIMIZATION OF BUILD TIME IN ADDITIVE MANUFACTURING

(71) Applicant: General Electric Company, Schenectady, NY (US)

(72) Inventors: Nitish Umang, Niskayuna, NY (US); Kai Hertel, Bamberg (DE); Christian Wacker, Bamberg (DE); Subhrajit Roychowdhury, Schenectady, NY (US); David Toledano, Niskayuna, NY (US); Srinivas Bollapragada, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 16/260,662

(22) Filed: Jan. 29, 2019

(65) Prior Publication Data
US 2020/0238623 A1    Jul. 30, 2020

(51) Int. Cl.
*B29C 64/393*    (2017.01)
*B29C 64/153*    (2017.01)
(Continued)

(52) U.S. Cl.
CPC ............ *B29C 64/393* (2017.08); *B22F 10/20* (2021.01); *B29C 64/153* (2017.08);
(Continued)

(58) Field of Classification Search
CPC ... B29C 64/393; B29C 64/153; B29C 64/268; B22F 3/1055; B22F 2003/1057; B33Y 50/02; B33Y 10/00; B33Y 30/00
See application file for complete search history.

(56) References Cited

U.S. PATENT DOCUMENTS

2015/0021304 A1\* 1/2015 Ozawa ................ B23K 26/382
                                                  219/121.71
2015/0123320 A1    5/2015 Joyce
(Continued)

FOREIGN PATENT DOCUMENTS

CA        2956436 A1    2/2016
CN      107498052 A    12/2017

OTHER PUBLICATIONS

Piili, Heidi et al., "Cost Estimation of Laser Additive Manufacturing of Stainless Steel", Physics Procedia, vol. 78, 2015, DOI: 10.1016/j.phpro.2015-11-053, (pp. 388-396, 9 total pages).
(Continued)

*Primary Examiner* — Thomas C Lee
*Assistant Examiner* — Charles Cai
(74) *Attorney, Agent, or Firm* — Dority & Manning, P.A.

(57) ABSTRACT

According to some embodiments, system and methods are provided comprising receiving input including: coordinates of one or more regions to be fabricated on a build plate, a laser boundary for each of two or more lasers, wherein the lasers fabricate the one or more regions, and a processing time for each region; deriving a prioritized sequence of the one or more regions to be fabricated; determining, based on the received coordinates and received laser boundary, one or more potential lasers assignments for each region; determining, based on the determined potential laser assignments, the prioritized sequence of the one or more regions, and the processing time for each region, a laser-to-region sequence for the one or more lasers to fabricate the one or more regions; assigning the determined laser-to-region sequence to the one or more lasers for fabrication of the one or more regions. Numerous other aspects are provided.

14 Claims, 9 Drawing Sheets

(51) Int. Cl.
*B29C 64/268* (2017.01)
*B22F 10/20* (2021.01)
*B33Y 10/00* (2015.01)
*B33Y 30/00* (2015.01)
*B33Y 50/02* (2015.01)
*B22F 10/30* (2021.01)

(52) U.S. Cl.
CPC ............ *B29C 64/268* (2017.08); *B22F 10/30* (2021.01); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2016/0114432 A1* | 4/2016 | Ferrar | B29C 64/393 219/76.12 |
| 2017/0056970 A1 | 3/2017 | Chin et al. | |
| 2017/0057164 A1 | 3/2017 | Hemphill et al. | |
| 2017/0189961 A1* | 7/2017 | Ferrar | B22F 3/101 |
| 2018/0043432 A1* | 2/2018 | Domrose | B22F 3/1055 |
| 2018/0093416 A1 | 4/2018 | Prexler et al. | |
| 2018/0144277 A1 | 5/2018 | Srivastava et al. | |
| 2018/0281112 A1 | 10/2018 | Roerig et al. | |
| 2018/0290239 A1 | 10/2018 | Haro Gonzalez et al. | |

OTHER PUBLICATIONS

Khairallah, Saad A. et al., "Laser powder-bed fusion additive manufacturing: Physics of complex melt flow and formation mechanisms of pores, spatter, and denudation zones", Acta Materialia, vol. 108, Apr. 15, 2016, DOI: 10.1016/j.actamat.2016.02.014, (pp. 36-45, 10 total pages).

International Search Report and Written Opinion dated Apr. 29, 2020 which was issued in connection with PCT/US2020/015609 which was filed on Jan. 29, 2020.

* cited by examiner

| Region ID | Region area | Centroid coordinates | Min coordinates | Max coordinates | Processing time (MS) | Part instance ID | Region potential lasers |
|---|---|---|---|---|---|---|---|
| R0 | 9824 | [51, 48] | [51, 48] | [50, 47] | 20.29 | 1918 | L2 L3 L4 |
| R1 | 103408 | [13, 85] | [11, 85] | [14, 86] | 54.34 | 1918 | L1 L2 L3 |
| R2 | 84907 | [88, -33] | [88, -34] | [89, -32] | 44.76 | 1918 | L2 L3 L4 |

Laser: L1

| Region ID | Process time 604 | Start time 606 | End time 608 | Mark parameter 610 | Part instance ID 612 | Candidate 514 | Laser assignment 618 | Idle time 614 | Jump time 616 |
|---|---|---|---|---|---|---|---|---|---|
| R2 | 400 | 100 | 500 | 5 | 1918 | (L1 L2 L3) | L1 | 100 | 100 |
| R45 | 0 | 600 | 600 | 5 | 1918 | (L1 L2 L3) | L1 | 100 | 100 |

602

Laser: L2

| Region ID | Process time | Start time | End time | Mark parameter | Part instance ID | Candidate | Laser assignment | Idle time | Jump time |
|---|---|---|---|---|---|---|---|---|---|
| R0 | 100 | 100 | 200 | 5 | 1918 | (L2 L3 L4) | L2 | 100 | 100 |
| R1 | 300 | 300 | 600 | 5 | 1918 | (L1 L2 L3) | L2 | 100 | 100 |

FIG. 6

| Smoke constraint validation | 808 | 804 | 810 | 812 |
|---|---|---|---|---|
| ID 1 | ID 2 | Min smoke lag | Actual lag | Is violated |
| R531 | R466 | 250 | 300 | False |
| R531 | R509 | 250 | 2300 | False |

OPTIMIZATION APPROACH TO LOAD BALANCING AND MINIMIZATION OF BUILD TIME IN ADDITIVE MANUFACTURING

BACKGROUND

Additive manufacturing (AM) processes are used to fabricate precision three-dimensional components from a digital model. Such components are fabricated using an additive process, where successive layers of material are solidified one on top of the other on a build plate. Some AM systems use a laser (or similar energy source) and a series of lenses and mirrors to direct the laser over a powdered material in a pattern provided by a digital model (powder-bed AM). The laser solidifies the powdered material by sintering or melting the powdered material. To achieve high throughput, multiple lasers may work in parallel, where each laser has a defined area that it may access on the build plate. These defined areas may overlap each other.

A challenge in powder-bed AM is that multiple lasers cannot work on a same area at a same time. To avoid multiple lasers are not working in the same area at the same time, some lasers may be idle while other lasers are working. The build time for a part may be as long as the laser having to perform the most work.

Therefore, it would be desirable to provide a system and method that optimizes the build time for the part.

BRIEF DESCRIPTION

According to some embodiments, a method includes receiving input including: coordinates of one or more regions to be fabricated on a build plate, a laser boundary for each of two or more lasers, wherein the lasers fabricate the one or more regions, and a processing time for each region; deriving a prioritized sequence of the one or more regions to be fabricated; determining, based on the received coordinates and received laser boundary, one or more potential lasers assignments for each region; determining, based on the determined potential laser assignments, the prioritized sequence of the one or more regions, and the processing time for each region, a laser-to-region sequence for the one or more lasers to fabricate the one or more regions; assigning the determined laser-to-region sequence to the one or more lasers for fabrication of the one or more regions.

According to some embodiments, a system includes an additive manufacturing device operative to fabricate one or more regions, wherein the additive manufacturing device includes a build plate and two or more lasers; a load balancing module; and a memory in communication with the additive manufacturing device and storing program instructions, the load balancing module operative with the program instructions and additive manufacturing device to perform the functions as follows: receive input including: coordinates of a region to be fabricated on the build plate, a laser boundary for each of one or more lasers, wherein the lasers fabricate the one or more regions, and a processing time for each region; derive a prioritized sequence of the one or more regions to be fabricated; determine, based on the received coordinates and received laser boundary, one or more potential laser assignments for each region; determine, based on the determined potential laser assignment, the prioritized sequence of the one or more regions and the processing time of reach region, a laser-to-region sequence for the one or more lasers to fabricate the one or more regions; assign the determined laser-to-region sequence to the one or more lasers to fabricate the one or more regions.

According to some embodiments, a non-transitory computer readable medium includes instructions that, when executed by a computer processor, cause the computer processor to perform a method comprising: receiving input including: coordinates of one or more regions to be fabricated on a build plate, a laser boundary for each of one or more lasers, wherein the lasers fabricate the one or more regions, and a processing time for each region; deriving a prioritized sequence of the one or more regions to be fabricated; determining, based on the received coordinates and received laser boundary, one or more potential lasers assignments for each region; determining, based on the determined potential laser assignments, the prioritized sequence of the one or more regions, and the processing time for each region, a laser-to-region sequence for the one or more lasers to fabricate the one or more regions; assigning the determined laser-to-region sequence to the one or more lasers for fabrication of the one or more regions.

A technical effect of some embodiments of the invention is an improved technique and system for fabricating parts via AM processing. Some embodiments provide for the determination of optimal assignment and sequence of laser beams to regions (e.g., component of a part) to minimize the overall completion time of fabricating the component and balancing the workload among different lasers as equitably as possible, thereby increasing the throughput of the additive machine performing the AM process. Some embodiments provide near optimal laser-to-region assignments containing several hundred regions in computation time of only a few minutes. Another technical effect of some embodiments is an automated way of assigning lasers-to-regions, thus saving on labor cost and time spent in developing the assignment manually or simple rule-based approaches. Still another technical effect of some embodiments is the processing of raw data and passing of data inputs related to the exact geometry of the laser scan field layout and region locations on the powdered material layer on the build plate. Yet another technical effect of some embodiments is the incorporation of a smoke flow model (i.e., how smoke travels and impacts the adjoining regions on the powdered material layer on the build plate). By explicitly accounting for smoke lag constrains, the degradation in part quality due to smoke is avoided to a large extent. Still yet another technical effect of some embodiments is the capability to pre-select laser assignment to specific regions or enforce same laser assignment to the same segment type or part type. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

FIG. 5 illustrates an input chart according to some embodiments.

FIG. 6 illustrates an output chart according to some embodiments.

FIG. 8 illustrates a smoke drift model output according to some embodiments.

DETAILED DESCRIPTION

Figure 1:
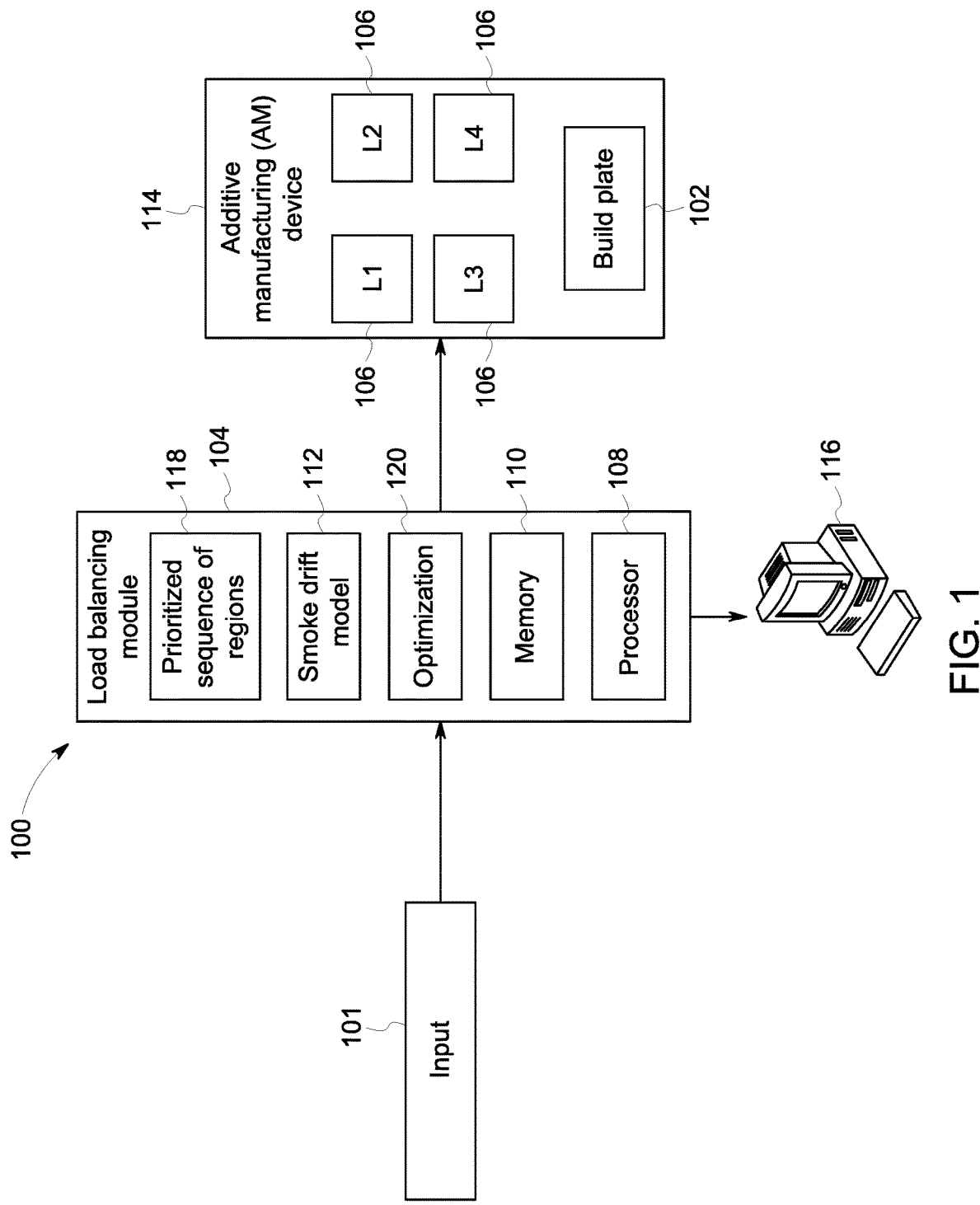
FIG. 1 illustrates a system according to some embodiments.

An example of an AM process is called powder-based melting. In this technology, laser beams are used to melt powdered grains of material on a build plate ("material") to build one or more parts, layer-by-layer in a controlled three-dimensional space. The material may be, for example, polymers, metals, ceramics, etc. Other suitable materials may be used. To achieve high throughput for a large build area, multiple lasers may work in parallel. Each laser may have a defined scan field boundary (e.g., an area that may be exposed to the laser). There may be overlap in the defined scan field boundaries between two or more lasers. As it is undesirable to have two or more lasers contact the same material on the build plate, when laser scan field boundaries overlap, the lasers may take turns, so that while a first laser is exposing the material to the laser beam, a second laser is idle, for example.

It is also noted that in some instances a first area of a build plate may have a lot of components being built thereon, while a second area of the build plate has substantially less. Conventionally, this instance would result in the laser that reaches the first area performing a lot more work than the laser that reaches the second area. Additionally, in this conventional instance, the laser with the most work may dictate how long it will take to build the part.

Another factor involved in AM processes is smoke occlusion. When a laser beam contacts the powder, smoke is generated. It is desirable to avoid other laser beams passing through the smoke, as it may degrade the quality of the part being fabricated. When the laser beam passes through the smoke, the efficiency of the laser beam or even the build process itself may be interrupted by the smoke absorbing or reflecting part of the beam energy. Additionally, the energy beams move at a higher velocity compared to the smoke, which may pose the risk of the laser beam shooting through clouds of smoke particles. This may result in degradation in quality across or within geometric regions of the product, where quality may be characterized by factors such as material porosity, surface roughness, mechanical stresses within the resting product, etc. In a multi-beam process, the smoke problem may be even more challenging as it may scale not only with beam intensity but also with the number of beams. As such, it may be desirable to only expose those areas of material on the build plate to a laser beam that have avoided smoke contamination. Conventional AM processes may not account for smoke occlusion.

Embodiments provide for a load balancing module to distribute the load (i.e. work) performable by the two or more lasers in an AM device as equally as possible between the lasers. In determining the equitable distribution, the load balancing module may take into account processing time, smoke drift, laser boundary, and region size/coordinates, and other suitable parameters. Embodiments may coordinate the beams in a way that in addition to avoiding their own smoke, the beams do not interfere with the smoke trajectory generated by other beams and the build quality is not compromised by the smoke.

Figure 2:
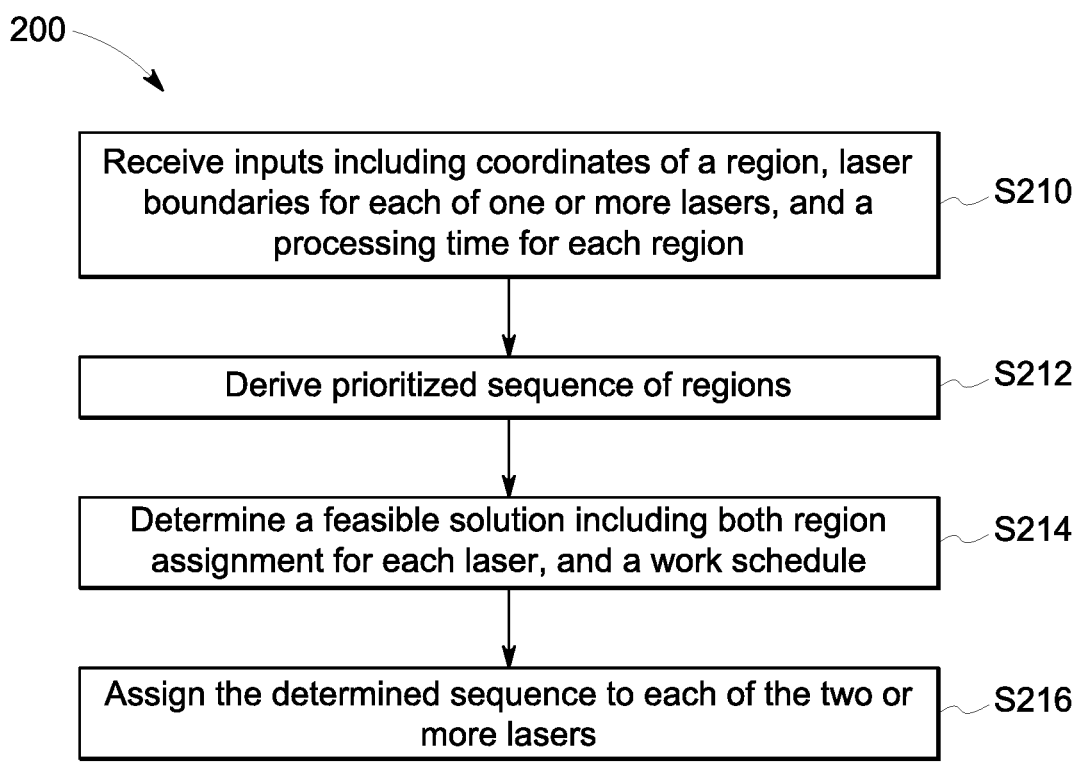
FIG. 2 illustrates a flow diagram according to some embodiments.
Figure 7:
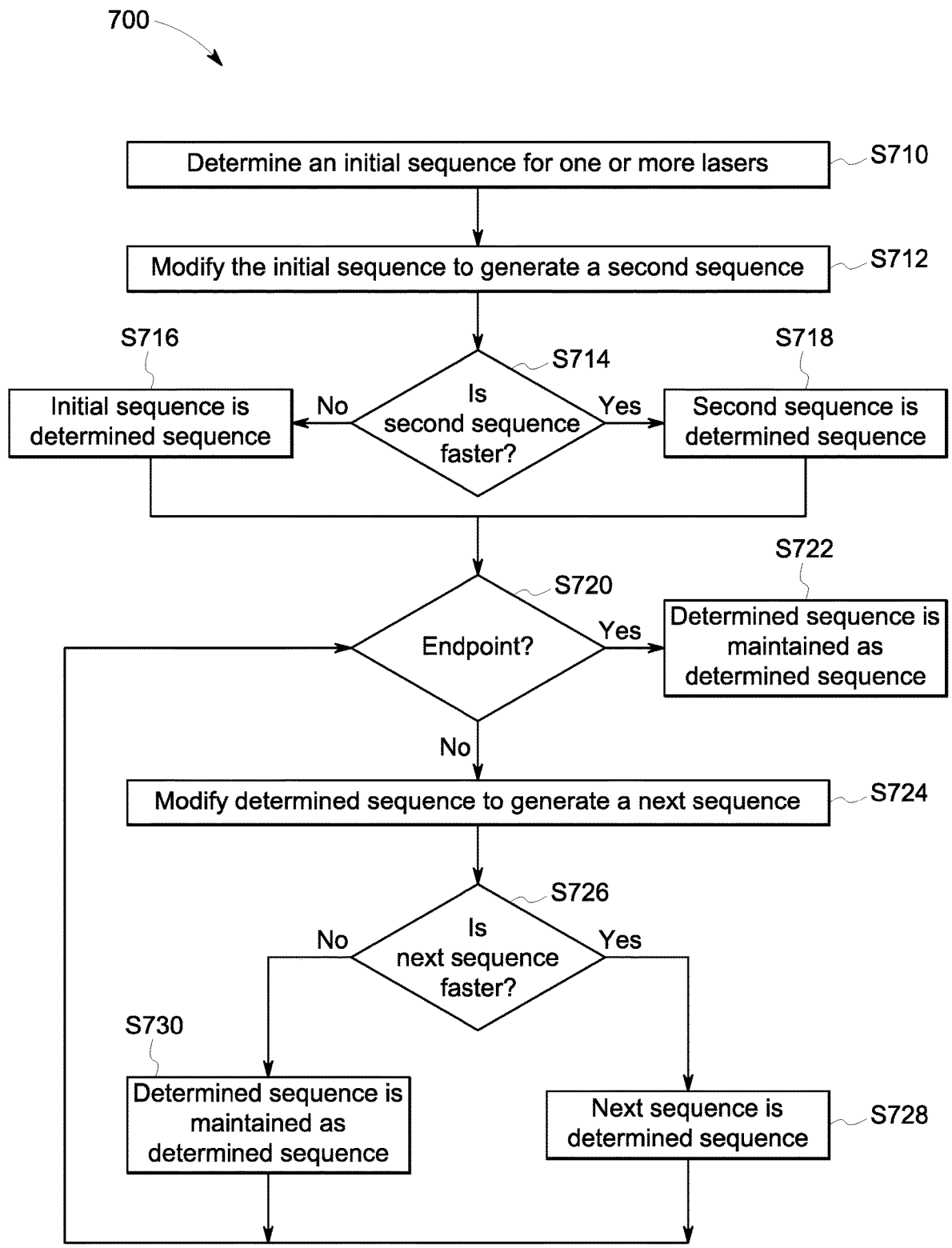
FIG. 7 illustrates a flow diagram according to some embodiments.

Turning to FIGS. 1-8, a system 100 and diagrams of examples of operation according to some embodiments are provided. In particular, FIGS. 2 and 7 provide a flow diagram of a process 200/700, according to some embodiments. Processes 200/700 and other processes described herein may be performed using any suitable combination of hardware (e.g., circuit(s)), software or manual means. In one or more embodiments, the system 100 is conditioned to perform the processes 200/700 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto.

Figure 4:
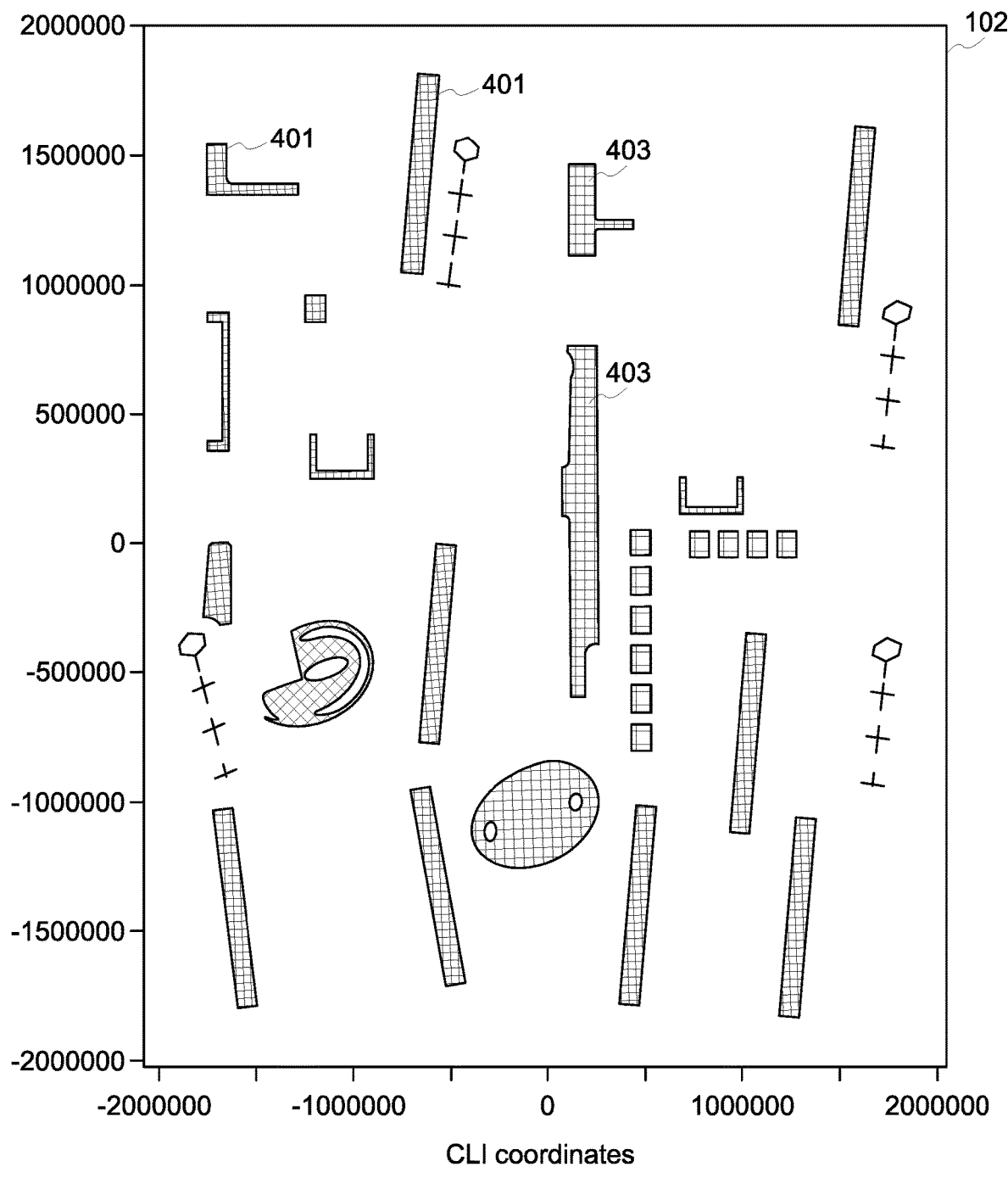
FIG. 4 illustrates a build plate according to some embodiments.

Prior to the start of the process 200, a build plate 102 is provided. The build plate 102 may be 400 mm×400 mm or any other suitable size. The build plate area may be provided to a load balancing module 104 prior to the start of the process 200. The build plate 102 may include thereon powdered grains of material (not shown), as described above. Additionally, two or more lasers 106 are provided. While four lasers 106 (L1, L2, L3 and L4) are shown herein and described herein in the non-exhaustive examples, any suitable number of lasers may be used. Any suitable type of laser for AM processing may be used. As described above, the laser beams may melt the grains of material to fabricate a layer of a region 403 (FIG. 4) of a part. The "region" 403 may refer to a component of the part being fabricated on a given area on the build plate. The part may be fabricated from many (e.g., thousands or any other suitable number) regions 403 that may be spread across the build plate 102. For example, as shown in FIG. 4, each shaded area on the build plate 102 represents an independent part 401 being fabricated. The shaded area is the part 401 that has been fabricated by exposing the material on the build plate to the lasers. It is noted that each part 401 may include one or more segments (not shown), and each segment may include several regions 403, that may be very small. As described further below, each region may be assigned to one laser.

Initially, at S210, inputs 101 are received at the load balancing module 104. In one or more embodiments, the inputs 101 may include coordinates for a first layer of each region 403 on the build plate 102. The coordinates may be received from a user (not shown) via manual entry, a file or any other suitable source. In one or more embodiments, the coordinates may be computed by the load balancing module 104 from data in a command-line interface (CLI) file or any other suitable file. In one or more embodiments, the coordinates may include a centroid coordinate 502, a minimum X, Y coordinate 504 and a maximum X, Y coordinate 506, a total hatch length (not shown), a region area 508, and any other suitable coordinate. It is noted that each pair of coordinates is a single point. The regions 403 are assumed small enough, so that it is defined by three pairs of coordinates—minimum coordinates, maximum coordinates and centroid coordinates. The maximum (minimum) coordinates may be interpreted as the top right (bottom left) coordinates of the bounding box of the region.

The load balancing module 104 may include one or more processing elements 108 and a memory 110. The processor 108 may, for example, be a conventional microprocessor, and may operate to control the overall functioning of the load balancing module 104. In one or more embodiments, the load balancing module 104 may include a communication controller for allowing the processor 108, and hence the load balancing module 104, to engage in communication over data networks with other devices (e.g., the additive manufacturing device 114 and user interface 116). In one or more embodiments, the load balancing module 104 may include one or more memory and/or data storage devices 110, which may comprise any combination of one or more of a hard disk drive, RAM (random access memory), ROM (read only memory), flash memory, etc. The memory/data storage devices 110 may store software that programs the processor 108 and the load balancing module 104 to perform functionality as described herein.

Another input 101 received at the load balancing module 104 in S210 is a laser boundary 302 for each of the one or more lasers 106 received at the load balancing module 104. It is noted that the process 200 may be used for balancing workload when there are two or more lasers. When balancing workload, the total processing time may be implicitly minimized. It is further noted that the process 200 may also be used to minimize the total processing time when there is one laser to process a sequence of regions.

Figure 3:
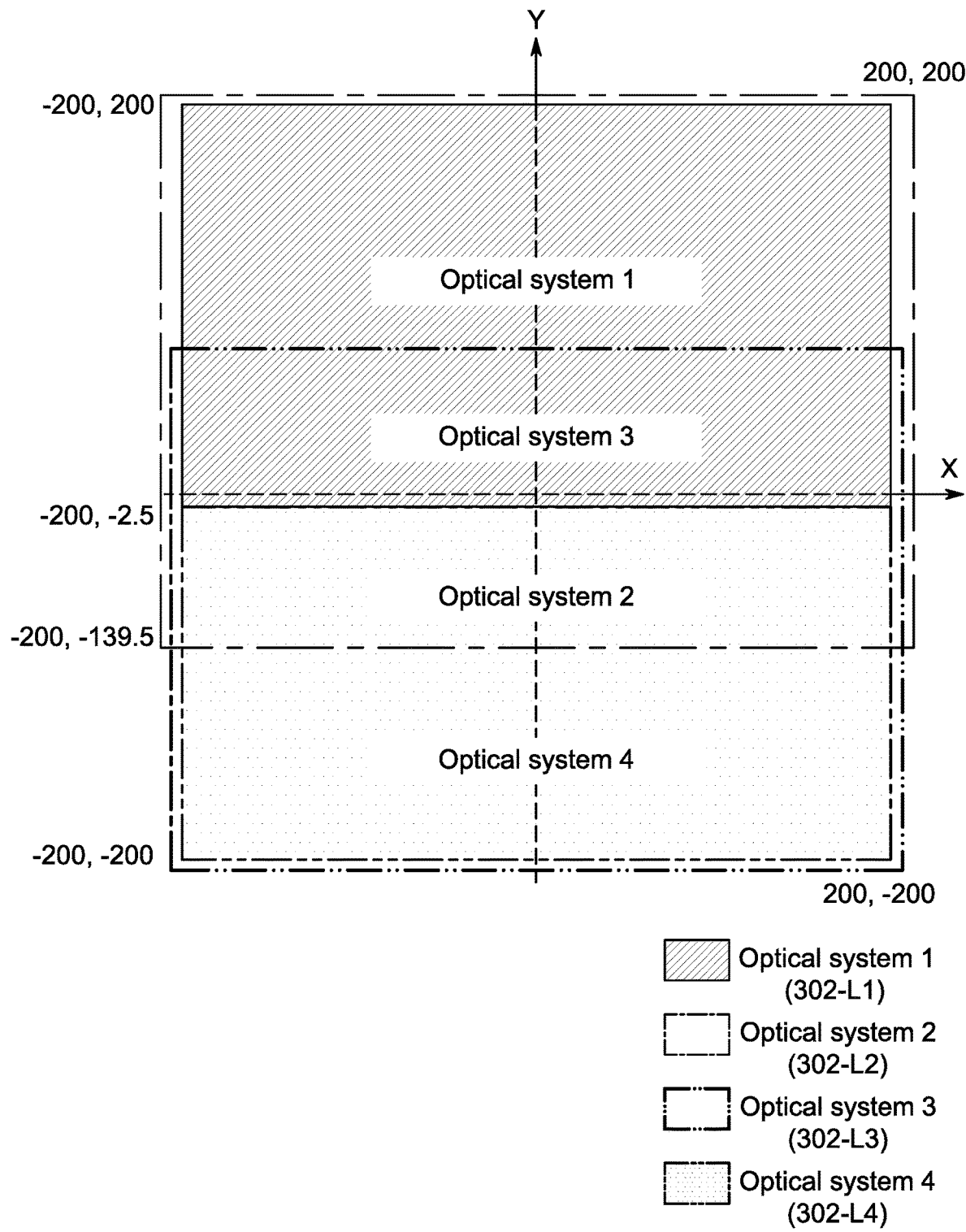
FIG. 3 illustrates a build plate with laser boundaries according to some embodiments.

The laser boundary 302 is the area on the build plate 102 that may be exposed to a given laser 106 (e.g., the scan field of the laser), and may be referred to as a "scan field area". As shown in FIG. 3, there are four lasers, L1, L2, L3 and L4, where each laser has a well-defined scan field area. The coordinates shown in FIG. 3 represent the left bottom coordinate of the scan field area for that laser. Each laser may have a different laser boundary 302. For example, in FIG. 3 the laser boundaries 302 for L1, L2, L3 and L4 are labeled as Optical System 1, Optical System 2, Optical System 3 and Optical System 4, respectively. As shown herein, Optical System 1 has a laser boundary 302-L1 of approximately the top half of the build plate 102, and Optical System 4 has a laser boundary 302-L4 of approximately the bottom half of the build plate 102. Optical System 2 has a laser boundary 302-L2 that overlaps with Optical System 1, 3 and 4; and Optical System 3 has a laser boundary 302-L3 that overlaps with Optical Systems 1, 2 and 4.

Still another input 101 received at the load balancing module 104 in S210 is a processing time 510 for the fabrication of each region 403. The processing time may be received from data files, or other suitable sources. It is noted that the processing time may one of an actual time and an estimated time. In one or more embodiments, the load balancing module 104 may receive other inputs including, but not limited to, a part instance ID 512, a mark parameter ID (segment type) (not shown), hatch coordinates (not shown), pair-wise region jump times (not shown), planning window horizon, optimization time limits, and any other suitable inputs from a data file or any other suitable source. As used herein, "jump time" is the time taken for the laser beam to traverse the distance from one region to another. In one or more embodiments, the load balancing module 104 may also receive other constraint parameters, including but not limited to, assigning a same laser to regions with a same mark parameter ID, assigning a same laser to regions with a same part instance ID, maintaining a particular temperature; maintaining a particular angle at which the laser contacts the build plate; limiting a gap in time between fabricating one element of the region and another element of the same region. It is noted that while the input 101 received by the load balancing module 104 is described herein as being received simultaneously, the input 101 may be received sequentially in any suitable order. It is also noted that the input 101 is received from a data file, or other suitable source.

In one or more embodiments, the load balancing module 104 may also derive, at S212, a prioritized sequence of regions 118 for the regions to be exposed to the lasers. This prioritized sequence may be derived based on data from a data file, or any other suitable source. For example, the prioritized sequence may indicate that the build plate (and regions thereon) be processed from right to left, in a direction opposite to the direction of smoke flow to minimize smoke disruption.

Based on the received region coordinates and received laser boundaries, in S214, the load balancing module 104 may determine a feasible solution, via an optimization model 120, including both the lasers that are assigned to a given region 514 (FIG. 5), as well as a work schedule (i.e. sequence in which the regions are processed "laser to region sequence 602" (FIG. 6)). As described above, there may be overlap of the laser boundaries of two or more lasers, and it is desirable to have a given region exposed to one laser at a time.

In one or more embodiments, the laser-to-region sequence is the order in which a particular laser contacts different region of the build plate. In one or more embodiments, the laser-to-region sequence may be based on the potential laser assignments 514, the prioritized sequence 118, and the processing time 510 for each region. The determination of the laser-to-region sequence is further explained below with respect to FIG. 7. In one or more embodiments, the laser-to-region sequence 602 may include, for each laser 106, and for each region to which the laser is assigned, a process time 604, a start time 606 indicating when the laser should begin contacting the region, an end time 608 indicating when the laser should cease contacting the region, a mark parameter (i.e., segment id) 610, a part instance ID 612 indicating which part the region is fabricated for, an idle time 614 indicating the amount of time the laser is not contacting the region during the process time and a jump time 616. In one or more embodiments the idle time may refer to the time spent by a laser not processing any region, i.e., it may include the jump time and the wait because of smoke lag.

Once the laser-to-region sequence is determined, the laser-to-region sequence is assigned, via transmission, to the two or more lasers in S216 (laser assignment 618) for fabrication of the one or more regions 403. In one or more embodiments, the laser-to-region sequence may be output to a user platform 116 (a control system, a desktop computer, a laptop computer, a personal digital assistant, a tablet, a smartphone, etc.) to view information about and/or manage the lasers/AM device in accordance with any of the embodiments described herein. In one or more embodiments, the user interface may display a visual graphical output of the build plate including the laser-to-region assignment with timestamps, and any other suitable information. In one or more embodiments, the user platform may display the percentage of idle time for each laser. The work load may be considered "balanced" when the makespan of all the lasers is as close as possible, where "Makespan of the laser" is the time taken by the laser to finish processing the last region in the sequence of regions it is assigned to.

In one or more embodiments, in addition to controlling the lasers, the output from the optimization model may be transmitted to various user platforms or to other systems (not shown), as appropriate (e.g., for display to, and manipulation by, a user).

Turning to FIG. 7, a process 700 for determining the laser-to-region sequence 602 is provided. In one or more embodiments, the process 700 may be an optimization process using the optimization model 120. In one or more embodiments, the optimization model 120 may use a k-opt local search process for optimization. The optimization model 120 may use any other suitable optimization process. In S710, an initial sequence for two or more lasers is determined. The initial sequence may be based on the prioritized sequence of regions 118, described above. The initial sequence may then be mapped to a feasible solution including laser-to-region assignment (i.e., which region is assigned to which laser) and the work schedule (i.e., start time and end time of processing each region). This may be done using a construction heuristic, which is a rule-based logic/algorithm. As a non-exhaustive example of the construction heuristic, say the first region is assigned to laser L1 (region should be in scan field boundary of L1). Then L1 is blocked for the processing time of that region (which is given), and a second region is then assigned to laser L2, and so on. The load balancing module 104 may then determine, based on the feasible solution, a corresponding process time or makespan value, which it may be desirable to minimize.

Next, in S712, the initial sequence may be modified to generate a second sequence. In one or more embodiments, a local search is performed on the initial sequence to determine a local search neighbor that is better than the initial sequence. As commonly used, a local search process starts from a candidate solution and then iteratively moves to a neighbor solution, based on a defined neighborhood relation in the search space. As such, in order to generate a neighbor solution, the neighborhood structure is defined. In one or more embodiments, the neighborhood structure is a sequence obtained by interchanging k regions in the original sequence. As a non-exhaustive example, for k=2, the local search neighbor (i.e. second sequence) is obtained by a simple swap between two regions in the initial sequence. As with the initial sequence, the load balancing module 104 may determine the process time of the region using the second sequence. For example, if the initial sequence was Region 1 (R1), Region 2 (R2), Region 3 (R3), the second sequence may be R1, R3, R2.

Next, it is determined in S714 whether the second sequence is faster than the initial sequence. This determination may be based on a comparison of process times for the initial sequence and the second sequence. When it is determined in S714 that the second sequence is not faster than the initial sequence, the initial sequence may be designated as the determined laser-to-region sequence 602 (from S214) in S716. When it is determined in S714 that the second sequence is faster than the initial sequence, the second sequence may be designated as the determined laser-to-region sequence 602 (from S214) in S718. Following both S716 and S718, it may be determined in S720 whether a local search endpoint is met. In one or more embodiments, the local search and sequence modification may be performed again to generate successively better laser-to-region sequences until the local search endpoint is met. In one or more embodiments, the local search endpoint may be a pre-set computation time limit (e.g., the process 700 is continued for a pre-set amount of time), a pre-set improvement time (e.g., if the process time does not improve within a pre-set amount of time) or any other suitable endpoint. When, in S720 the local search endpoint is met, the process proceeds to S722 and the determined sequence from one of S716 and S718 is the laser-to-region sequence 602 used in S214 of process 200. When in S720 the local search endpoint is not met, the process 700 may proceed to S724 and the determined sequence from one of S716 or S718 is modified to generate a next sequence. As described above, the local search is performed to generate the next sequence. Using the next sequence, the process time of the region is then determined by the load balancing module 104. It is then determined in S726 whether the next sequence is faster than the determined sequence. When the process time of the next sequence is less than the process time of the determined sequence, the process proceeds to S728 and the next sequence is designated as the determined laser-to-region sequence 602. When the next sequence is greater (i.e. slower) than the determined sequence, the determined sequence is designated as the determined laser-to-region sequence 602 in S730. Following both S728 and S730, the process 700 returns to S720 and is iterative until the endpoint is met. It is noted that thousands of sequences may be generated and evaluated during the run time of this process 700.

In one or more embodiments, the load balancing module 104 may also use a smoke drift model 112 as an input in determining the laser-to-region sequence 602 in S214. The smoke drift model 112 may account for the reduction in smoke concentration over a distance and time, and how the smoke drift impacts the processing of adjoining regions. As described above, when a laser bean contacts the powder, smoke is generated. It is desirable to avoid other laser beams passing through the smoke, as it may degrade the quality of the part being fabricated. When the laser beam passes through the smoke, this may affect the efficiency of the laser and be disruptive to the build process, as described above. As such, one or more embodiments provide a coordination of the lasers in a laser-to-region sequence 602 in a way that each laser avoids its own smoke and does not interfere with the smoke trajectory generated by other laser beams. For example, there may be a certain wait time between an end time of processing region R1 and a start time of processing a next region R2. This is the time required for the smoke (generated from processing R1) to pass R2, if region R2 is in the smoke influence area of R1. One or more embodiments may prevent degradation in material quality by using the smoke drift model 112 to output a minimum wait period (e.g., lag time 804—FIG. 8) between the processing of two regions depending on their distance and direction of smoke flow. For example, for two given regions (Region A and Region B), once fabrication in Region A is finished, Region B cannot be worked on for a specified time (e.g., 250 ms) because Region B is in the smoke created from lasers fabricating Region A. As such, in this example, the smoke drift model outputs the lag time (250 ms) for activation of the laser on Region B based on a time for smoke from the laser in Region A to dissipate. The output 800 of the smoke drift model 112 may be based on previous experimental data, or other suitable data. It is noted that the smoke parameters (downstream distance, lateral spread as a function of distance, etc.) may depend on attributes including, but not limited to, laser power, spot size, powder material, cross-flow speed, etc. As a non-exhaustive example, FIG. 8 provides a chart 800 that may include the input and output for the smoke drift model 112. The minimum smoke lag 804 may be an input based on the distance between two regions and the smoke speed, as it related to a first region 806 with ID1 and a second region 808 with ID 2. The actual lag time 810 may be the output of smoke drift model 112. If the actual lag is greater than the minimum, the smoke lag constraint is respected. The flag 812 (some constraint is violated?) is "false" in that case, and thus also part of the output. It is noted that when the output from the smoke drift model is used in determining the laser-to-region sequence, there may be a longer process time than if the smoke drift model has not been used, as the lag time is being taken into account. However, using the lag time may result in a better quality product.

Figure 9:
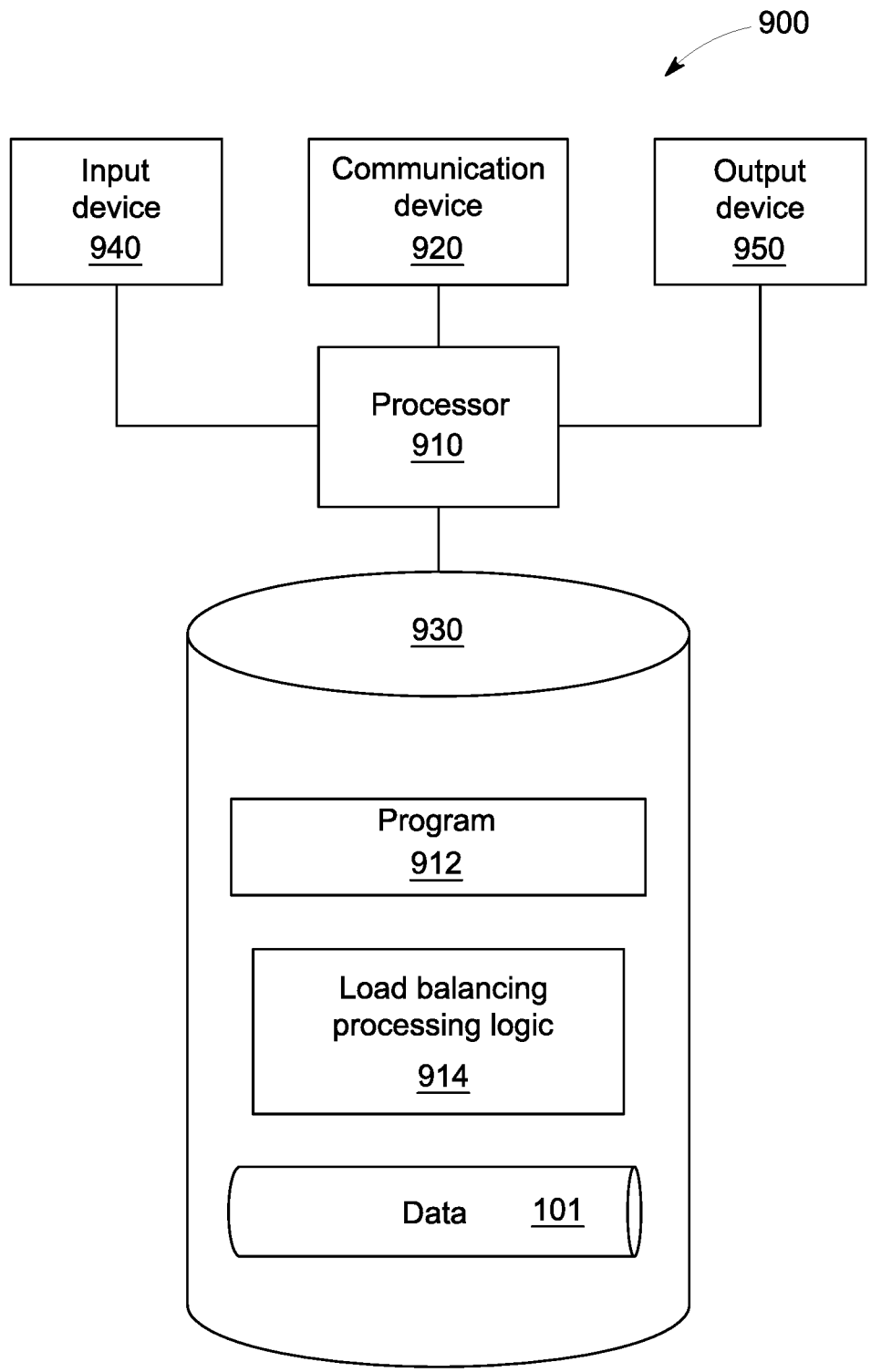
FIG. 9 illustrates s a block diagram of a system according to some embodiments.

Note the embodiments described herein may be implemented using any number of different hardware configurations. For example, FIG. 9 illustrates a load balancing processing platform 900 that may be, for example, associated with the system 100 of FIG. 1. The load balancing processing platform 900 comprises a load balancing processor 910 ("processor"), such as one or more commercially available Central Processing Units (CPUs) in the form of one-chip microprocessors, coupled to a communication device 920 configured to communicate via a communication network (not shown in FIG. 9). The communication device 920 may be used to communicate, for example, with one or more users. The load balancing processing platform 900 further includes an input device 940 (e.g., a mouse and/or keyboard to enter information about the part) and an output device 950 (e.g., to output and display the data and/or recommendations).

The processor 910 also communicates with a memory/storage device 930. The storage device 930 may comprise any appropriate information storage device, including combinations of magnetic storage devices (e.g., a hard disk drive), optical storage devices, mobile telephones, and/or semiconductor memory devices. The storage device 930 may store a program 912 and/or load balancing processing logic 914 for controlling the processor 910. The processor 910 performs instructions of the programs 912, 914, and thereby operates in accordance with any of the embodiments described herein. For example, the processor 910 may receive input and then may apply the load balancing module 104 via the instructions of the programs 912, 914 to generate a laser-to-region sequence to assign to two or more lasers for fabrication of one or more regions of a part.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices.

As used herein, information may be "received" by or "transmitted" to, for example: (i) the platform 900 from another device; or (ii) a software application or module within the platform 900 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a load balancing module. The method steps can then be carried out using the distinct software modules and/or sub-modules of the system, as described above, executing on one or more hardware processors 910 (FIG. 9). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method comprising:
   receiving input including: coordinates of two or more regions to be fabricated on a build plate, a laser boundary for each of two or more lasers, wherein the lasers fabricate the two or more regions, a processing time for each region, and a smoke drift model;
   deriving a prioritized sequence of the two or more regions to be fabricated;
   determining, based on the received coordinates and received laser boundary, one or more potential lasers assignments for each region;
   determining a laser-to-region sequence for the two or more lasers to fabricate two or more regions, the laser-to-region sequence based on: 1. the determined potential laser assignments, 2. the prioritized sequence of the two or more regions, 3. the processing time for each region, and 4. a lag time output by the smoke drift model for activation of one of the two or more lasers based on a time for smoke from another one of the two or more lasers to dissipate, wherein the laser-to-region sequence is a scheduled processing order for the two or more regions including a scheduled assignment of processing start time for each of a first laser and a second laser of the two or more lasers to process the two or more regions, wherein the laser-to-region sequence optimizes a makespan of the two or more lasers and avoids contact by the first laser with smoke produced by the first laser and smoke trajectory generated by the second laser of the two or more lasers, and the determination of the laser-to-region sequence is prior to processing of the one or more regions;

assigning the determined laser-to-region sequence to the two or more lasers for fabrication of the two or more regions.

2. The method of claim 1, wherein fabrication of the two or more regions is via contact between a laser beam from the at least two lasers and the region.

3. The method of claim 2, wherein the laser-to-region sequence includes a processing end time for each contact of the laser beam and the region.

4. The method of claim 1, wherein the laser boundary for each laser is an area on the build plate that is accessible by the laser.

5. The method of claim 1, wherein determining the laser-to-region sequence further comprises:
determining an initial sequence for the two or more lasers, the initial sequence having an initial processing time;
modifying the initial sequence to generate a second sequence for the two or more lasers, the second sequence having a second processing time; and
determining whether the second processing time is less than the initial processing time.

6. The method of claim 5, wherein the second sequence is the determined laser-to-region sequence when the second processing time is less than the initial processing time, and wherein the initial sequence is the determined laser-to-region sequence when the initial processing time is less than the second processing time.

7. The method of claim 5, further comprising:
determining whether a local search endpoint is met;
modifying the second sequence to generate a third sequence when the local search endpoint is not met and when the second processing time is less than the initial processing time, the third sequence having a third processing time;
determining whether the third processing time is less than the second processing time; and
wherein the third sequence is the determined laser-to-region sequence when the third processing time is less than the second processing time, and wherein the second sequence is the determined laser-to-region sequence when the second processing time is less than the third processing time.

8. A system comprising:
an additive manufacturing device operative to fabricate two or more regions, wherein the additive manufacturing device includes a build plate and two or more lasers;
a load balancing module; and
a memory in communication with the additive manufacturing device and storing program instructions, the load balancing module operative with the program instructions and additive manufacturing device to perform the functions as follows:
receive input including: coordinates of each region to be fabricated on the build plate, a laser boundary for each of two or more lasers, wherein the lasers fabricate the two or more regions, a processing time for each region, and a smoke drift model;
derive a prioritized sequence of the two or more regions to be fabricated;
determine, based on the received coordinates and received laser boundary, one or more potential laser assignments for each region;
determine a laser-to-region sequence for the two or more lasers to fabricate two or more regions, the laser-to-region sequence based on: 1. the determined potential laser assignment, 2 the prioritized sequence of the two or more regions, 3. the processing time of each region and 4. a lag time output by the smoke drift model for activation of one of the two or more lasers based on a time for smoke from another one of the two or more lasers to dissipate, wherein the laser-to-region sequence is a scheduled processing order for the two or more regions including a scheduled assignment of processing start time for each of a first laser and a second laser of the two or more lasers to process the two or more regions, wherein the laser-to-region sequence optimizes a makespan of the two or more lasers, and avoids contact by the first laser with smoke produced by the first laser and smoke trajectory generated by the second laser of the two or more lasers, and the determination of the laser-to-region sequence is prior to processing of the one or more regions;
assign the determined laser-to-region sequence to the one or more lasers to fabricate the one or more regions.

9. The system of claim 8, wherein fabrication of the two or more regions is via contact between a laser beam from at least one of the lasers and the region.

10. The system of claim 9, wherein the laser-to-region sequence includes a processing end time for each contact of the laser beam and the region.

11. The system of claim 8, wherein determining the laser-to-region sequence further comprises program instructions to perform the functions as follows:
determine an initial sequence for the two or more lasers, the initial sequence having an initial processing time;
modify the initial sequence to generate a second sequence for the two or more lasers, the second sequence having a second processing time; and
determine whether the second processing time is less than the initial processing time.

12. The system of claim 11, wherein the second sequence is the determined laser-to-region sequence when the second processing time is less than the initial processing time, and wherein the initial sequence is the determined laser-to-region sequence when the initial processing time is less than the second processing time.

13. The system of claim 11, further comprising program instructions to perform the functions as follow:
determine whether a local search endpoint is met;
modify the second sequence to generate a third sequence when the local search endpoint is not met and when the second processing time is less than the initial processing time, the third sequence having a third processing time;

determine whether the third processing time is less than the second processing time; and wherein the third sequence is the determined laser-to-region sequence when the third processing time is less than the second processing time, and wherein the second sequence is the determined laser-to-region sequence when the second processing time is less than the third processing time.

14. A non-transitory computer-readable medium storing instructions that, when executed by a computer processor, cause the computer processor to perform a method comprising:

receiving input including: coordinates of two or more regions to be fabricated on a build plate, a laser boundary for each of two or more lasers, wherein the lasers fabricate the two or more regions, a processing time for each region, and a smoke drift model;

deriving a prioritized sequence of the two or more regions to be fabricated;

determining, based on the received coordinates and received laser boundary, one or more potential lasers assignments for each region;

determining a laser-to-region sequence for the two or more lasers to fabricate two or more regions, the laser to region sequence based on: 1. the determined potential laser assignments, 2. the prioritized sequence of the one or more regions, 3. the processing time for each region, and 4. a lag time output by the smoke drift model for activation of one of the two or more lasers based on a time for smoke from another one of the two or more lasers to dissipate wherein the laser-to-region sequence is a scheduled processing order for the two or more regions including a scheduled assignment of processing start time for each of a first laser and a second laser to process the two or more regions, wherein the laser-to-region sequence optimizes a makespan of the two or more lasers, and avoids contact by the first laser with smoke produced by the first laser and smoke trajectory generated by the second laser of the two or more lasers, and the determination of the laser-to-region sequence is prior to processing of the one or more regions;

assigning the determined laser-to-region sequence to the one or more lasers for fabrication of the one or more regions.

* * * * *